United States Patent
Andersen

(10) Patent No.: US 8,531,267 B2
(45) Date of Patent: Sep. 10, 2013

(54) METHOD AND SYSTEM FOR VISUAL INDICATION OF THE FUNCTION OF WIRELESS RECEIVERS AND A WIRELESS RECEIVER

(75) Inventor: Marinus Andersen, Smørum (DK)

(73) Assignee: Oticon A/S, Smorum (DK)

(*) Notice: Subject to any disclaimer, the term of this patent is extended or adjusted under 35 U.S.C. 154(b) by 911 days.

(21) Appl. No.: 11/882,609

(22) Filed: Aug. 2, 2007

(65) Prior Publication Data
US 2008/0036574 A1 Feb. 14, 2008

(30) Foreign Application Priority Data

Aug. 3, 2006 (EP) .................................... 06118384

(51) Int. Cl.
*G08B 27/00* (2006.01)
(52) U.S. Cl.
USPC ......................................... 340/4.1; 340/4.13

(58) Field of Classification Search
USPC ................. 340/3.7, 5.33, 7.2, 7.61, 7.62, 4.1, 340/539.1, 539.16, 539.24, 573.1, 635, 815.47
See application file for complete search history.

(56) References Cited

U.S. PATENT DOCUMENTS

| | | | |
|---|---|---|---|
| 4,890,332 A | 12/1989 | Takahashi | |
| 5,355,136 A * | 10/1994 | Katagiri | 341/157 |
| 5,486,843 A * | 1/1996 | Otting et al. | 345/35 |
| 5,818,328 A * | 10/1998 | Anderson et al. | 340/384.72 |
| 2003/0123840 A1* | 7/2003 | Fujinami | 386/35 |
| 2005/0020207 A1* | 1/2005 | Hamada et al. | 455/41.2 |
| 2005/0231134 A1* | 10/2005 | Sid | 315/294 |
| 2006/0141936 A1 | 6/2006 | Auffret | |

* cited by examiner

*Primary Examiner* — Brian Zimmerman
*Assistant Examiner* — Omer S Khan
(74) *Attorney, Agent, or Firm* — Birch, Stewart, Kolasch & Birch, LLP

(57) ABSTRACT

A method for visual indication of the function of wireless receivers where a wireless signal is transmitted to a group of receivers, and where each receiver intermittently flashes a visual indicator when a wireless signal is received, whereby the intermittence and flashing of the visual indicators of the receivers are synchronized.

16 Claims, 3 Drawing Sheets

METHOD AND SYSTEM FOR VISUAL INDICATION OF THE FUNCTION OF WIRELESS RECEIVERS AND A WIRELESS RECEIVER

AREA OF THE INVENTION

The invention concerns class room or education systems where a wireless signal is transmitted from a transmitter to a group of receivers and whereby the wireless signal is received at each receiver and converted to an audio signal which is served at each wearer of a receiver in a form perceivable as sound.

BACKGROUND OF THE INVENTION

When hearing impaired children are using wireless systems for educations or other purposes, it can be very difficult for the caretaker to know whether the wireless system is actually working properly. Especially small children cannot report whether their receiver system is functional, thus a visual indication that the individual receiver is functional and is receiving properly can greatly improve ease of use for the caretaker. For this reason the OTICON FM receiver has an LED which will be lit when the system is functional and receiving the wireless signals.

However, having an LED on whenever the system is functional will increase power consumption and can cause technical problems like decreased range. A solution to this problem is to flash the LED every few seconds when the system is functional. This will decrease the added power consumption of a LED and could lessen any technical difficulties that arise from the active LED. This can be done without compromising the usefulness of the visual feedback facilitated by the LED at the receivers.

This solution introduces the following problem: A classroom full of students with wireless receivers, all flashing asynchronously, will be quite disturbing visually, and could cause loss of concentration for both the children and the caretaker. Further, it can be quite difficult to spot a not-flashing device in the midst of all the flashing devices going on and off at random, and possibly a non-functional apparatus may pass un-noticed for quite a while because of this.

SUMMARY OF THE INVENTION

In order to overcome the problem of visual disturbance stated above, a method for visual indication of the function of wireless receivers is provided where a wireless signal is transmitted to a group of receivers, and where each receiver intermittently flashes a visual indicator when a wireless signal is received, whereby the intermittence and flashing of the visual indicators of the receivers are synchronized.

This greatly decreases the visual disturbance of the system and a missing flash on a single apparatus will easily be noticed by the caretaker, who by means of the synchronized flashing, will know when to observe a receiver of an individual pupil to spot if it is working or not.

According to the method the wireless signal transmitted to the group of receivers comprises a control signal used by each receiver to control the flashing of the visual indicator. In this way it is ensured that the flashing indicator is synchronized among the receivers. The control signal can be a signal which initiates a timer simultaneously in each receiver, where the timers following this initiation will run synchronously in each receiver in the group and control the flashing function of the visual indicator. Alternatively, a control signal is provided from the transmitter each time a visual indication is desired. At each receiver a visual indication will then be flashed when a control signal is received, and when at the same time the wireless audio signal is being received.

In a preferred embodiment a carrier signal is used as the control signal, and when the carrier signal is detected, each receiver will start a timer used for controlling the flashing of the visual indicator. This allows a very simple system to be build based on a usual squelch function implemented in systems having a carrier signal. The squelch function suppresses the audio output whenever no carrier wave is received, and it is simple to use the same squelch function to suppress the visual indicator when no carrier signal is received, and to initiate a timer to control the visual indicator at the onset of reception of the carrier signal.

To synchronize flashing of the visual indicator, the carrier detection system is used as a common start point for all receivers. When a carrier is detected, each receiver will start a timer used for control of the flashing of a visual indicator. As the carrier is received simultaneously at each receiver, the timer will run in synchronized fashion in the receivers, and as the timer controls the on and off of the visual indicator, the indicator will turn on and off simultaneously on all receivers. If the receivers are already on channel before the transmitter starts transmitting, they will simultaneously detect the carrier when the transmitter is activated. This point of carrier detection will function as a common reference for the receivers, which thus allows them to flash their visual indicator synchronously.

In a preferred embodiment an FM signal is transmitted to the group of receivers. It could be argued that small variations in system clock will cause the synchronous LED flashing receivers to quickly drift and become asynchronous. This is prevented by the extremely accurate clock needed for an FM system to function. A particular advantage of the method is that any FM transmitter can be used without alterations, only the receivers need to be adapted to the method in order to have the synchronous flashing function.

Preferably a LED light is provided in each receiver and used as the visual indication. The advantages of the LED light are that it is power efficient and that it occupies very little space.

In an embodiment of the invention the timer used for controlling the flashing of the visual indicator is based on the clock of the FM system at each receiver. In this way it is ensured that the synchronous action of the flashing indicator is maintained for a long time due to the precision of the FM clock.

The invention also concerns an information system and a receiver related to the method.

DESCRIPTION OF A PREFERRED EMBODIMENT

Figure 1:
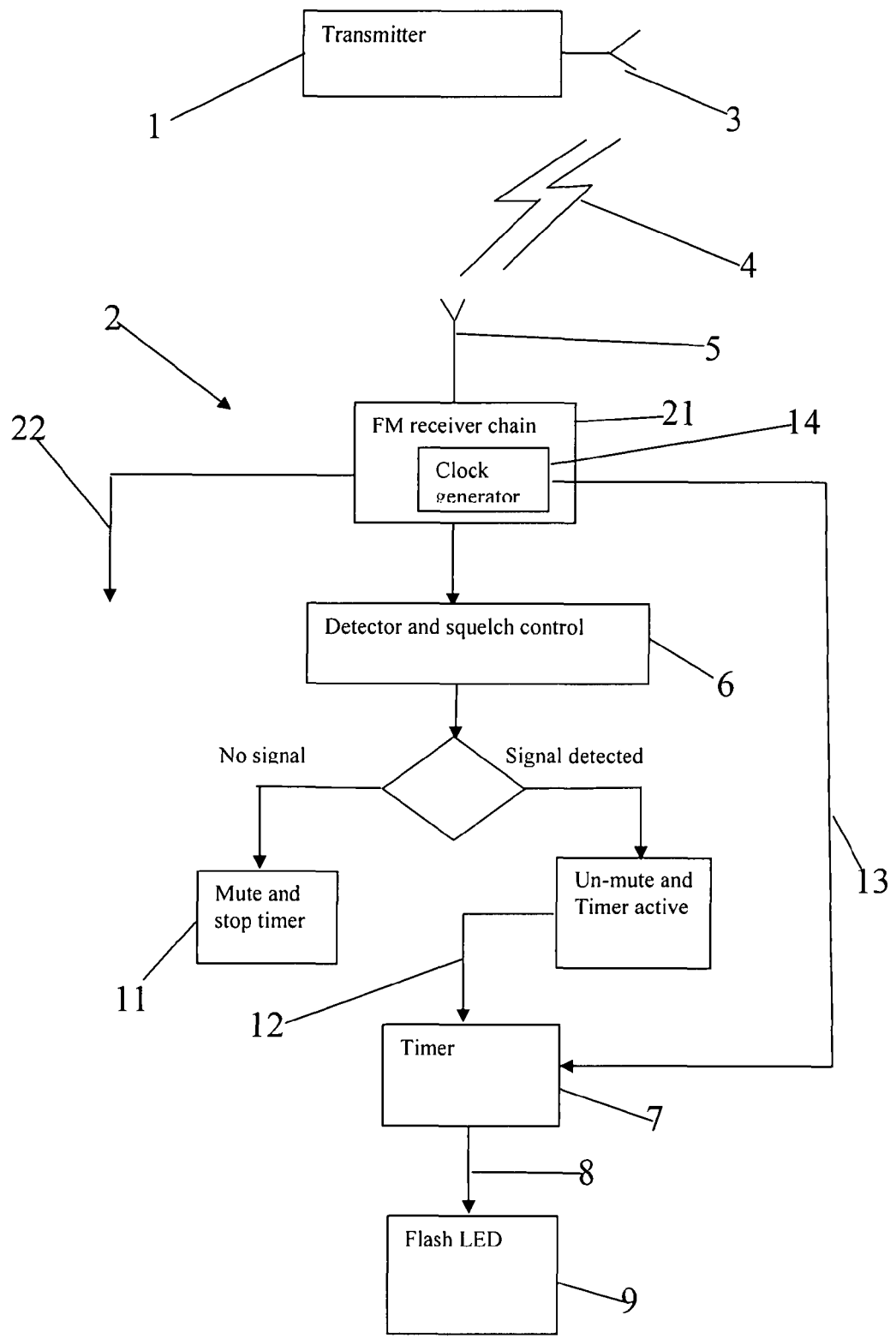
FIG. 1 shows a system diagram of the transmitter and receiver assembly of the invention.

In FIG. 1 a transmitter 1 with an antenna 3 is schematically shown. The antenna 3 transmits a FM signal 4 which is received at the antennas 5 of a group of receivers whereof one receiver 2 is schematically illustrated. The FM receiver chain 21 receives the signal, and here it is converted to an audio signal 22 which may be served at a transducer to provide sound sensations for the user. The FM receiver 2 used in the described embodiment of the invention has a squelch functionality comprising a detector 6, which detects whether a proper FM carrier signal is present in the signal received at the antenna 5. If no proper FM carrier signal is detected at the squelch detector 6, a mute signal 11 is provided and no audio signal is presented to the user. This prevents the user from experiencing "radio noise" when there is no transmitter, or the transmitter is out of range. At the onset of detection of a suitable FM carrier signal, the mute is turned off and at the same time, a timer 7 is initiated. The timer 7 will provide control signals 8 for control device 9, at regular intervals in order to control the action of the LED 27.

As the range of the FM signal 4 from the transmitter 1 to receiver 2 will always be good enough to cover the entire room, the FM signal can be used as a synchronization signal for all FM receivers 2 in the room. In this way the squelch function is not only used as a local system for muting the audio when the signal is poor or non existent, but also as a way of synchronizing actions of all FM receivers 2 within range and on channel. This method demands no special equipment on the transmitter side, and will function with any transmitter, as all that is required is the ability to transmit FM, and that the transmitter 1 can be turned off.

To perform the synchronization, firstly it must be ensured that all FM receivers 2 are turned on. Then the transmitter 1 is briefly turned off and then on again. When the transmitter is turned off, all FM receivers within range will simultaneously detect that no signal is present. When the transmitter becomes active again, all receivers in range will simultaneously detect the presence of a signal, and this will initiate the timer 7 in each receiver 2 and thereby cause the timers in all receivers to run synchronously, and thereby the flashing of the LED 27 will also be synchronized for all receivers.

The signal received by each FM receiver 2 is continuously analyzed by a DSP algorithm as part of the FM receiver chain 21, designed to determine whether the received signal is of sufficient quality for a decent audio output. As the receivers are configured to flash the LED 27 when receiving a signal, the LED 27 will continuously flash when the squelch algorithm signals through line 12 that a proper signal is received. If the FM transmitter 1 within range is turned off, the squelch detector change state from good signal to no signal and all the receivers will stop flashing. If the FM transmitter is turned on, the squelch detector will change state from no signal to good signal and all the receivers in the group will start flashing their LED indicators 27. As the squelch detector 6 of the receivers is configured in the same way, the state change in the squelch detector will happen close to simultaneously, at least more than close enough to appear as simultaneous to the naked eye. All receivers will then have synchronized timers, and thus flash their LED's in a synchronized manner. As FM receivers need very accurate clocks, synchronized timers in the individual receivers will stay synchronized to the naked eye for many hours.

If a pupil with a receiver enters the room, the flashing of this particular receiver may be out of time with the other receivers in the class. The caretaker may here briefly turn the transmitter 1 off and then on again in order that all the flashing LED's are time aligned.

Figure 2:
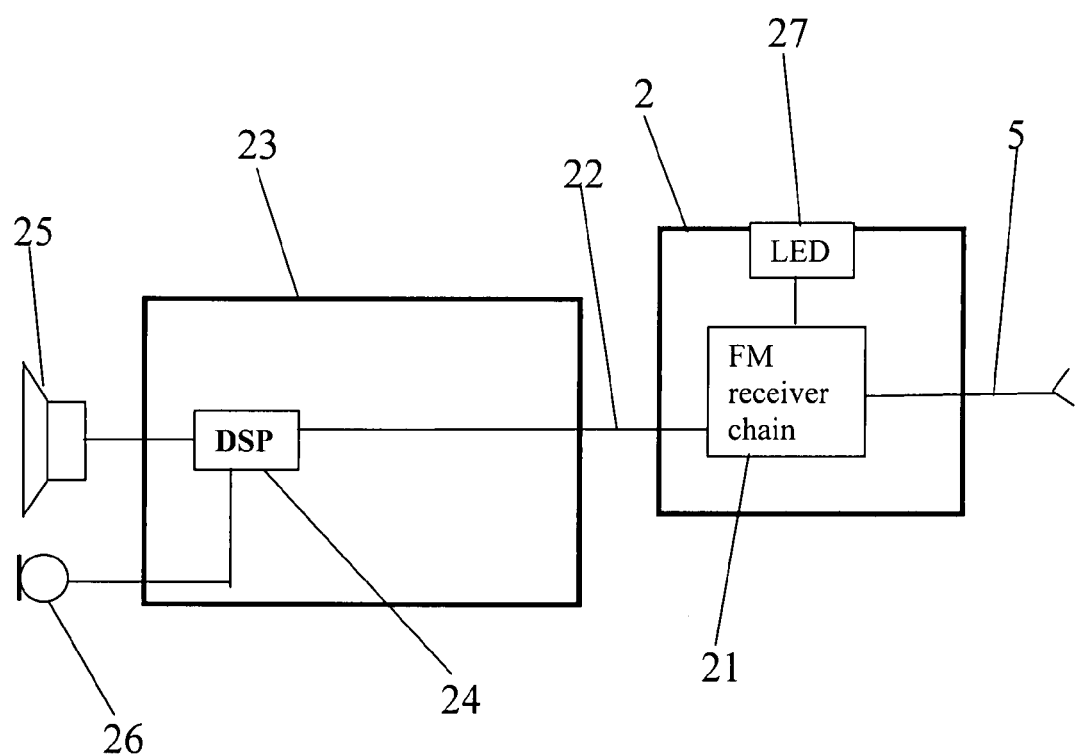
FIG. 2 shows a system diagram of the receiver in connection with a hearing aid.

In FIG. 2 a schematic view of a hearing aid 23 and a receiver 2 is shown. The antenna 5 on the receiver 2 is coupled to the FM receiver chain 21 and from the FM receiver chain 21 a connection line 22 is provided to the hearing aid 23. The FM receiver chain 21 delivers an audio signal to the line 22 which is served at the hearing aid DSP 24 for further enhancement according to the needs of the hearing aid user, and following this the audio signal is presented to the output transducer 25, which in FIG. 2 is represented by a loudspeaker symbol. Other transducers such as bone-conducting vibrators or cochlear electrodes may however be used depending on the user's needs. Usually, the hearing aid 23 further comprises a microphone 26 and the signal from the microphone 26 may be served along with the signal in line 22 from the receiver 2 or the microphone signal may be muted during reception of a signal in line 22. In FIG. 2 the LED 27 is shown schematically at the receiver 2, but the LED device may also be placed as part of the hearing aid 23.

Figure 3:
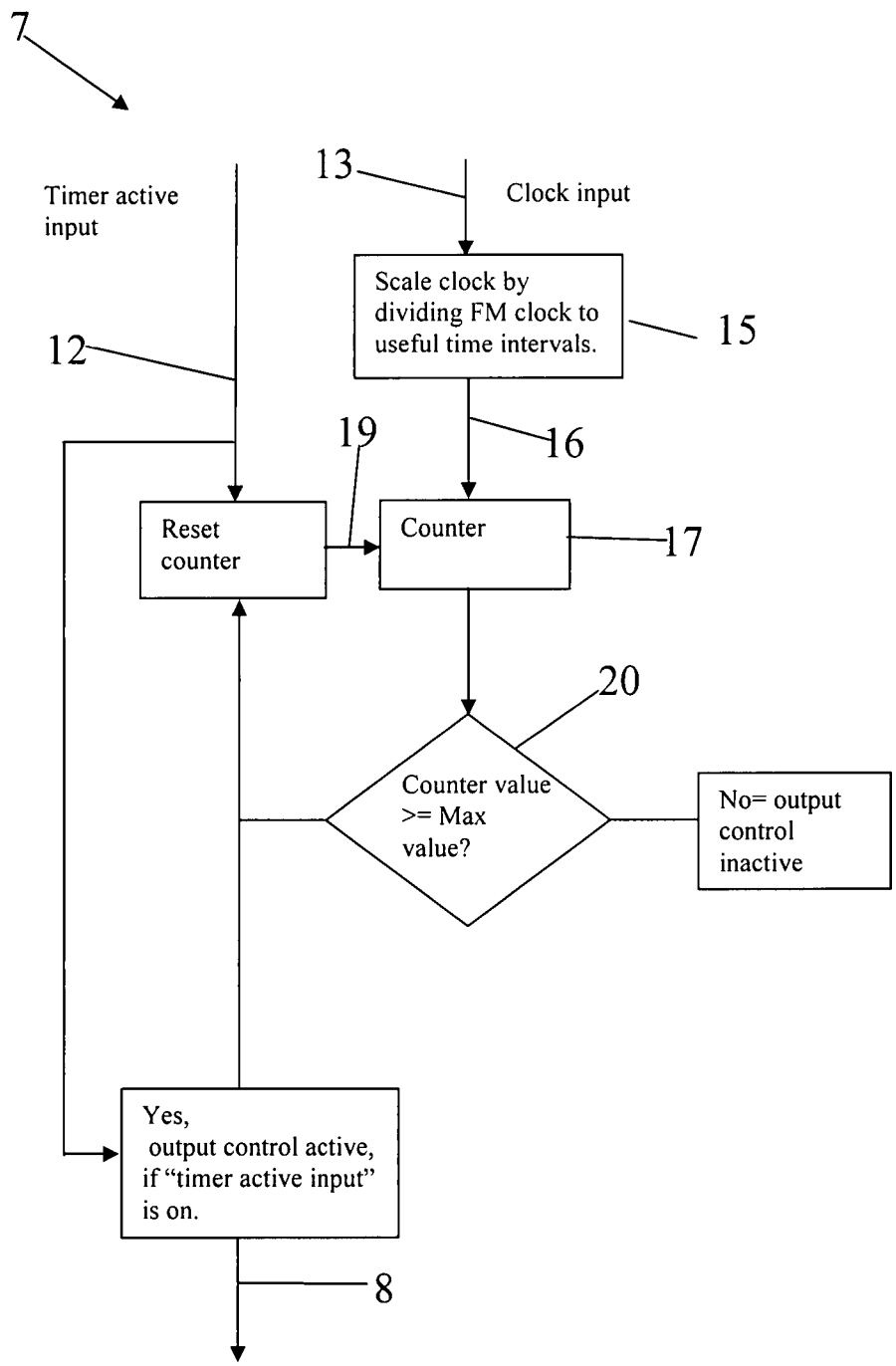
FIG. 3 shows a system diagram of the timer part of the receiver.

In FIG. 3 a schematic view of the timer 7 in the receiver is shown. The timer receives a clock input signal 13 provided by clock generator 14 of the FM receiver 2. The clock signal 13 is scaled at 15 to more useful time intervals and the resulting signal 16 is used in the counter 17 in the timer 7. The timer 7 further receives a signal on line 12 which indicates whether the FM receiver chain 21 receives a useful carrier signal at the antenna 5. When the signal on line 12 becomes active, a reset signal 19 is supplied to the counter 17, which then starts to count toward the value Max value as indicated in box 20. Until Max value is reached the control line 8 is kept inactive. Once the Max value is reached, a signal on line 8 to flash the LED becomes active on the condition that the timer active input line 12 is still active. The signal in line 8 is an interrupt which is used in the receiver to activate the LED for a predefined duration of time such that the flashing thereof may be observed from the outside. When the counter reaches the Max value a signal is further provided to reset the counter 17, such that the time to the next flashing of the LED is calculated.

In the described embodiment the synchronized action of the visual indicator for reception of a proper FM signal is caused by a control signal, whereby the control signal happens to also be the carrier signal of the FM signal. Surely a dedicated control signal which has no other function than controlling the timing of the flashing of the visual signal could be provided from the transmitter. Thus also systems based on other transmission techniques than FM may benefit from the invention. This could be systems based on infrared transmission or digital systems like blue-tooth systems.

In digital wireless transmission systems, a beacon signal is transmitted from a central transmitter and used at a number of receivers to time align their respective reception units to be turned on at the right time-slot for reception of a transmitted data package from the transmitter. In such systems the beacon signal may be used to ensure time aligned action such as flashing an indicator LED as described above.

In a number of receivers, which receives signals from one and the same transmitter, a synchronization signal may be used for other purposes than for synchronized action of visual indication means. Such a system may be used to provide a time aligned audio signal to the users of the receivers.

The invention claimed is:

1. A method for visual confirmation of the functioning of wireless receiver in a classroom, the method comprising:
   generating a wireless FM signal comprising a carrier signal in a teacher unit including a transmitter;
   transmitting from the transmitter said wireless FM signal to a group of student units, each including a receiver;
   receiving said wireless FM signal by the receivers in the student units;
   detecting presence of said carrier signal in the received wireless FM signal;
   initiating a timer in each receiver of the group of receivers responsive to the detected presence of said carrier signal;

intermittently flashing a visual indicator of each receiver that has initiated its respective timer, based on an output signal of said respective timer; and synchronizing the flashing with the activation of said signal indicating the presence of the carrier signal, wherein the intermittence and flashing of the visual indicators of the receivers are synchronized with each other based on the detected carrier signal indicating the presence of the carrier signal, and the timer is based on a clock of an FM system in each receiver.

2. The method as claimed in claim 1, wherein the wireless FM signal transmitted to the group of receivers includes a control signal used by each receiver to control the flashing of the visual indicator.

3. The method as claimed in claim 1, wherein an LED light is provided as the visual indication.

4. A classroom amplification system, comprising:

a teacher unit including a transmitter for wireless transmission of an FM wireless signal comprising a carrier signal, the transmitter configured to transmit the FM wireless signal; and a group of individual student units, each including a receiver, each receiver including a receiving unit configured to receive the FM wireless signal transmitted from the transmitter, a detector configured to detect presence of said carrier signal in the FM wireless signal, a timer configured to receive a result from the detector indicating the presence of said carrier signal and configured to be initiated responsive to said result, and a visual indicator configured to flash intermittently in response to a signal from the timer, wherein the intermittence and flashing of the visual indicators of the student units are synchronized with each other based on the detected carrier signal indicating the presence of the carrier signal, and the timer used for controlling the flashing of the visual indicator in each receiver is configured to receive a signal from a clock of an FM system in each receiver.

5. The classroom amplification system as claimed in claim 4, wherein a control signal is provided from the transmitter for controlling the flashing of the visual indication in each receiver.

6. The classroom amplification system as claimed in claim 4, wherein a LED light is provided in each receiver as the visual indicator.

7. A sound amplification unit, comprising:

a receiver for receiving a wireless FM signal comprising a carrier signal, the receiver including a receiving unit configured to convert the wireless FM signal to an audio signal which is servable to an individual in a manner perceivable as sound;

a detector configured to detect presence of the carrier signal in the FM wireless signal; a timer configured to receive a result from the detector indicating the presence of said carrier signal and configured to be initiated responsive to said result;

a visual indicator configured to flash intermittently in response to a signal from the timer, wherein the timer is initiated at the reception of said initiation signal, the intermittence and flashing of the visual indicator of the sound amplification unit is synchronized with visual indicators of other sound amplification units based on the detected carrier signal indicating the presence of the carrier signal, the receiver is an FM receiver, the receiver further comprises an FM clock, and the timer comprises a counter, which is clocked by a signal from the FM clock.

8. The method according to claim 1, wherein the generating comprises:

modulating the carrier signal with an audio signal.

9. The method according to claim 8, further comprising:

activating an audio output device of each receiver responsive to the detected presence of said carrier signal.

10. The method according to claim 9, wherein the audio output device of each receiver is muted in the absence of the carrier signal.

11. The method according to claim 1, wherein the initiating a timer comprises:

resetting a counter to an initial value.

12. The method according to claim 1, further comprising:

scaling an output of an FM clock in each receiver; and providing the scaled output of the FM clock in each receiver to a counter in each receiver.

13. The classroom amplification system according to claim 4, wherein the transmitter modulates the carrier signal with an audio signal to generate the FM wireless signal, the detector or each receiver converts the received FM wireless signal to an audio signal, and each receiver outputs the audio signal as sound perceivable to a user of the receiver.

14. The classroom amplification system according to claim 13, wherein each receiver activates an audio output device responsive to the detected presence of said carrier signal.

15. The classroom amplification system according to claim 14, wherein the audio output device of each receiver is muted in the absence of the carrier signal.

16. The sound amplification unit according to claim 7, wherein the receiver further comprises:

an audio output device configured to output an audio signal modulating the carrier signal in the wireless FM signal, wherein the audio output device is muted responsive to a lack of a detection of the carrier signal by the detector.

* * * * *